United States Patent
Duff et al.

(10) Patent No.: US 9,658,062 B2
(45) Date of Patent: May 23, 2017

(54) TARGET HOLDER AND METHOD OF COUPLING TARGET HOLDER TO VEHICLE WHEEL

(71) Applicant: Honda Motor Co., Ltd., Minato-ku, Tokyo (JP)

(72) Inventors: Douglas J. Duff, Marysville, OH (US); Thomas W. Kara, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

(21) Appl. No.: 14/814,265

(22) Filed: Jul. 30, 2015

(65) Prior Publication Data

US 2017/0030711 A1 Feb. 2, 2017

(51) Int. Cl.
*G01B 11/275* (2006.01)
*F16B 9/02* (2006.01)

(52) U.S. Cl.
CPC ............ *G01B 11/275* (2013.01); *F16B 9/023* (2013.01); *G01B 2210/30* (2013.01)

(58) Field of Classification Search
CPC .......................... G01B 11/275; B60G 21/051
USPC ....... 33/203, 203.18, 203.19, 203.2
See application file for complete search history.

(56) References Cited

U.S. PATENT DOCUMENTS

| | | | | |
|---|---|---|---|---|
| 3,443,318 A * | 5/1969 | MacMillan | ............ | G01B 5/255 33/203.18 |
| 4,363,175 A * | 12/1982 | Hedahl | ................ | G01B 11/275 248/231.21 |
| 5,546,665 A * | 8/1996 | Jackmauh | ............. | G01B 5/255 180/231 |
| 5,987,761 A * | 11/1999 | Ohnesorge | ............. | G01B 5/255 33/203.18 |
| 7,621,054 B2 * | 11/2009 | Abke | ................. | G01B 11/2755 33/203 |
| 7,702,126 B2 * | 4/2010 | Strege | ....................... | B66F 7/28 187/203 |
| 2002/0170195 A1 * | 11/2002 | Corghi | .................... | G01B 5/255 33/520 |
| 2007/0068016 A1 * | 3/2007 | Stieff | ................. | G01B 11/2755 33/203.18 |
| 2008/0209744 A1 * | 9/2008 | Stieff | ................. | G01B 11/2755 33/203.18 |
| 2008/0244919 A1 * | 10/2008 | Douglas | ................... | G01B 5/10 33/203.16 |

(Continued)

*Primary Examiner* — G. Bradley Bennett
(74) *Attorney, Agent, or Firm* — Arent Fox LLP (57) ABSTRACT

A target holder that can be secured within a central aperture of a vehicle wheel includes a base defining a central axis of the target holder. The base has a first end configured to receive a target and an opposing second end. A retainer is coupled to the second end of the base. The retainer is insertable into the central aperture and engageable with the vehicle wheel to secure the target holder to the vehicle wheel. A plunger is disposed in the retainer. A lever is pivotably coupled to the base and operatively coupled to the plunger. With the retainer inserted into the central aperture, the lever is actuateable to move the plunger toward the retainer to urge a terminal end portion of the retainer to expand radially outward from the central axis of the target holder to engage an inner wall of the vehicle wheel defining the central aperture.

20 Claims, 6 Drawing Sheets

(56) References Cited

U.S. PATENT DOCUMENTS

2010/0274514 A1* 10/2010 Kamachi ............... G01B 21/26
  702/94
2015/0253222 A1* 9/2015 Fitzpatrick, Jr. .... G01M 17/013
  33/203

* cited by examiner

TARGET HOLDER AND METHOD OF COUPLING TARGET HOLDER TO VEHICLE WHEEL

BACKGROUND

The subject matter disclosed herein relates to a target holder and, more particularly, to a mechanism for coupling a wheel aligner target holder to a vehicle wheel.

Conventional wheel alignment systems include a target holder having clips or teeth that extend over an outer rim of the wheel to couple the target holder to the wheel. The clips or teeth are positioned about the circumference of the wheel to secure the target holder to the wheel. These clips or teeth may undesirably scratch the outer, visible surface of the wheel.

SUMMARY

In one aspect, a target holder that can be secured within a central aperture of a vehicle wheel includes a base defining a central axis of the target holder. The base has a first end configured to receive a target and an opposing second end. A retainer is coupled to the second end of the base. The retainer is insertable into the central aperture and engageable with the vehicle wheel to secure the target holder to the vehicle wheel. A plunger is disposed in the retainer. A lever is pivotably coupled to the base and operatively coupled to the plunger. With the retainer inserted into the central aperture, the lever is actuateable to move the plunger with respect to the retainer to urge a terminal end portion of the retainer to expand radially outward with respect to the central axis to engage an inner wall of the vehicle wheel defining the central aperture.

In another aspect, a target holder to facilitate alignment of wheels on a vehicle includes a base defining a central axis of the target holder. The base has a first end configured to receive a target and an opposing second end defining a cylindrical recess. A retainer is positioned within the cylindrical recess and fixedly coupled to the second end of the base. A terminal end portion of the retainer is movable between a closed configuration and an expanded configuration to engage an inner wall of the wheel defining a central aperture of the wheel. A plunger is disposed in the retainer. A lever is pivotably coupled to the base and movable between a first position and a second position. A bolt is positioned within the base along the central axis. The bolt operatively couples the lever to the plunger. As the lever is moved from the first position to the second position, the bolt moves along the central axis of the target holder to urge the plunger against the retainer to move the terminal end portion of the retainer to the expanded configuration with the lever in the second position.

In yet another aspect, a method for coupling a target holder to a wheel of a vehicle includes inserting into a central aperture of the wheel a retainer operatively coupled to a base of the target holder and engaging the retainer with the wheel to secure the target holder to the wheel.

BRIEF DESCRIPTION OF THE DRAWINGS

Other aspects and advantages of certain embodiments will become apparent upon consideration of the following detailed description, wherein similar structures have similar reference numerals.

DETAILED DESCRIPTION

The embodiments described herein provide an exemplary target holder, such as a wheel aligner target holder, that can be quickly and easily secured within a central aperture of a vehicle wheel to facilitate aligning wheels on a vehicle. The central aperture of the wheel is accessible once a center cap is removed from the wheel. Unlike conventional target holders, the exemplary target holder disclosed herein prevents or limits undesirable damage, such as scratches, to the vehicle wheel during use.

The exemplary target holder includes a base, a retainer, a plunger, and a lever. A target is received in or at a first end of the base, and, in one embodiment, a clamp couples to the base to secure the target to the base. The retainer is received in a second end of the base. The retainer is inserted into the central aperture of the wheel and engages the wheel to secure the target holder to the wheel.

In certain embodiments, the retainer is cup-shaped and includes longitudinal slots disposed around a perimeter of the retainer to enable a terminal end portion of the retainer to radially expand and contract with respect to a central axis of the target holder (e.g., to increase or decrease, respectively, a diameter of the retainer at least at the terminal end portion). The retainer has an outer surface configured to contact and/or engage an inner wall of the wheel defining the central aperture. The plunger is disposed in the retainer and operatively coupled to the lever. Once the retainer is inserted into the central aperture of the wheel, the lever is actuated to move the plunger toward the retainer. As the plunger is moved toward the retainer, the plunger urges or pushes the terminal end portion of the retainer radially outward with respect to the central axis of the target holder and urges the outer surface of the retainer against the inner wall of the wheel defining the central aperture.

Figure 1:
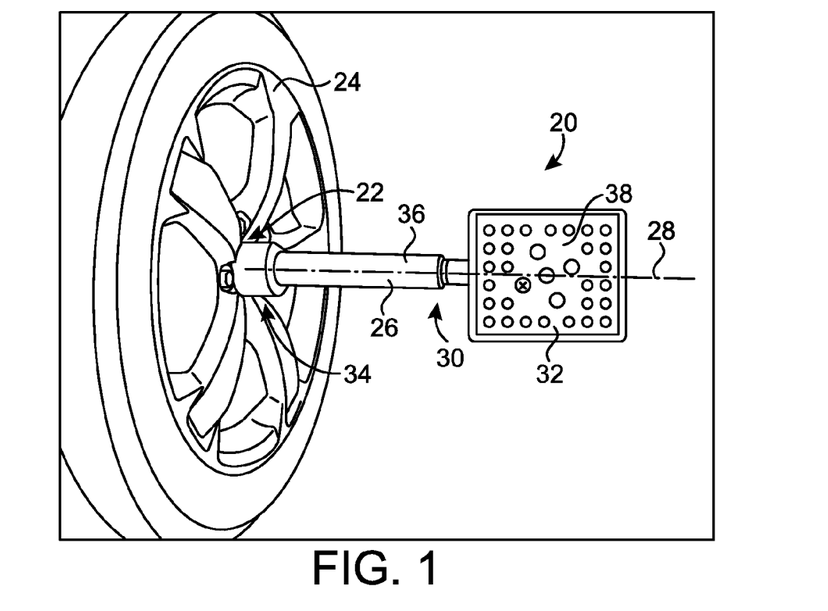
FIG. 1 is an exemplary target holder coupled to a wheel of a vehicle.
Figure 2:
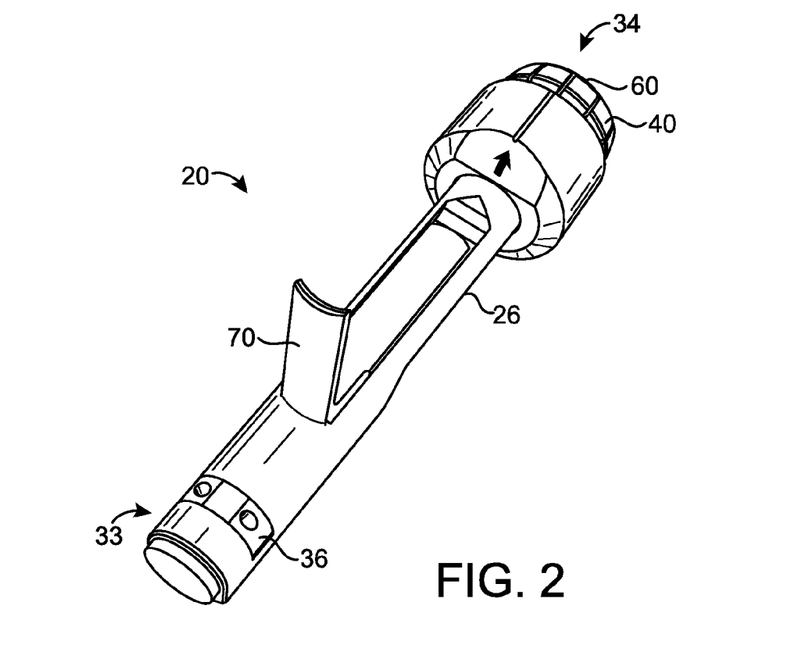
FIG. 2 is a perspective view of an exemplary target holder.

Referring to FIGS. 1-13 and, initially, to FIG. 1, a target holder 20 is configured to securely couple to a central aperture 22 of a vehicle wheel 24 to facilitate performing a wheel alignment on a vehicle, for example. The target holder includes a base 26 defining a central axis 28 of target holder 20. Base 26 has a first end 30 configured to receive a target 32 and an opposing second end 34. As shown in FIG. 1, a clamp 36 is configured to couple target 32 to base 26. Target 32 includes a reflective target panel 38 to facilitate determining wheel angles and/or alignment of one or more wheels to facilitate accurately aligning the vehicle wheels for improved handling and performance.

Figure 8:
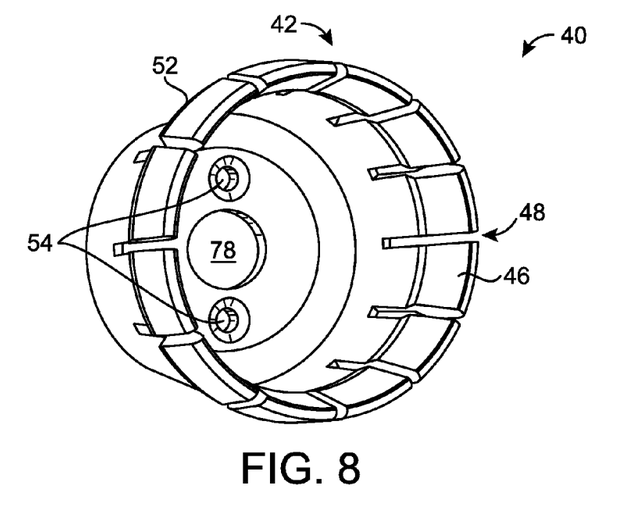
FIG. 8 is a perspective view of an exemplary retainer of the target holder shown in FIG. 2.
Figure 9:
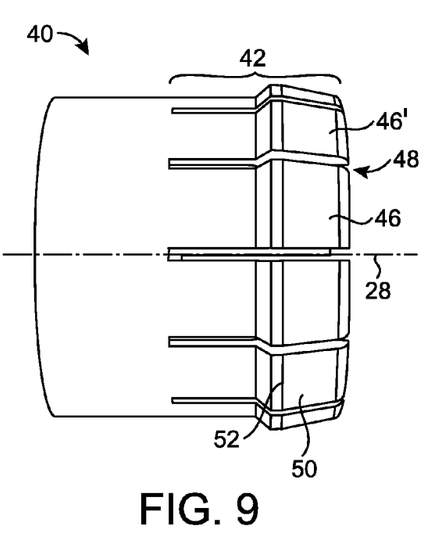
FIG. 9 is a side view of the retainer shown in FIG. 8.
Figure 10:
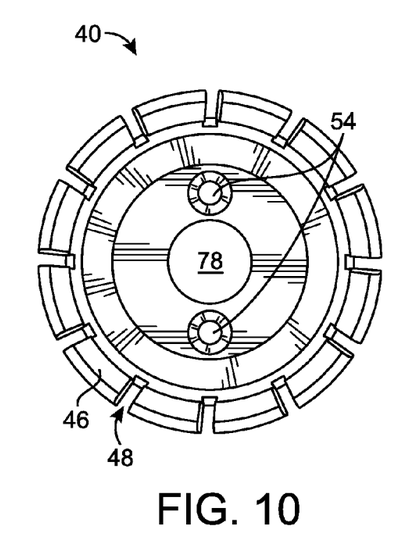
FIG. 10 is a front view of the retainer shown in FIG. 8.

Referring further to FIGS. 2-13, and particularly FIGS. 8-10, target holder 20 includes a retainer 40 coupled to second end 34 of base 26. Retainer 40 is insertable into central aperture 22 of vehicle wheel 24 and engageable with vehicle wheel 24 to secure target holder 20 to vehicle wheel 24, as shown in FIG. 1. In the embodiment shown in FIGS. 8-10, retainer 40 includes a terminal end portion 42 having a perimeter 44. As shown, terminal end portion 42 defines a plurality of members 46 disposed around perimeter 44 of retainer 40. In a particular embodiment, adjacent members 46, 46' are separated by a slot 48 to enable terminal end portion 42 of retainer 40 to radially expand and contract with respect to central axis 28 of target holder 20. As shown in FIG. 9, slot 48 extends along a portion of a length of retainer 40 parallel with central axis 28 of target holder 20. Terminal end portion 42 is movable between a closed configuration and an expanded configuration to engage an inner wall defining central aperture 22 of vehicle wheel 24. In a particular embodiment, terminal end portion 42 is biased toward the closed configuration so that absent an outward radial force against terminal end portion 42, terminal end portion 42 remains in the closed configuration.

With retainer 40 in the expanded configuration, each member 46 expands radially outward from central axis 28 to contact an inner wall of vehicle wheel 24 defining central aperture 22 to facilitate securing target holder 20 to vehicle wheel 24. In one embodiment, each member 46 has an outer surface 50 configured to frictionally contact and/or engage vehicle wheel 24. For example, each member 46 may have a protrusion 52 as shown in FIG. 9, a projection or a suitable knurled surface region formed on outer surface 50 of member 46 to provide frictional contact between retainer 40 and the inner wall of vehicle wheel 24 to facilitate securing target holder 20 to vehicle wheel 24.

In one embodiment, retainer 40 defines one or more apertures 54 configured to receive a suitable fastener (not shown), such as a screw or a bolt, to fixedly couple retainer 40 to base 26. Referring further to FIGS. 2-5, in the embodiment shown, retainer 40 is received within a cylindrical recess 56 defined in second end 34 of base 26. In this embodiment, retainer 40 is positioned within cylindrical recess 56 and fixedly coupled to second end 34 of base 26. In this embodiment, retainer 40 is coaxially aligned with central axis 28 of target holder 20.

Figure 11:
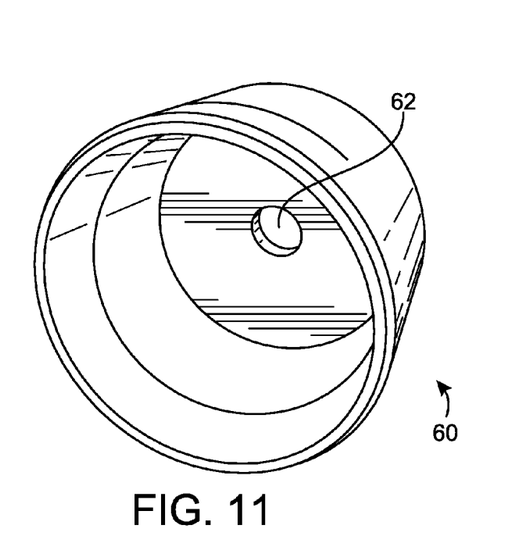
FIG. 11 is a perspective view of an exemplary plunger of the target holder shown in FIG. 2.
Figure 12:
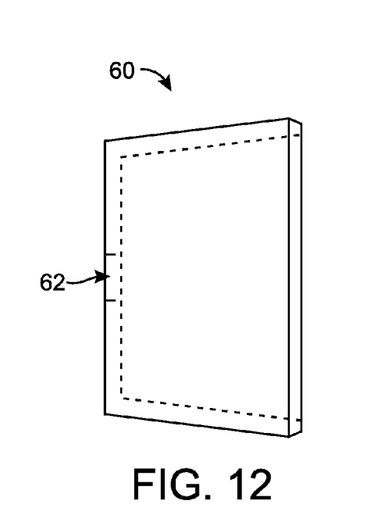
FIG. 12 is a side view of the plunger shown in FIG. 11.
Figure 13:
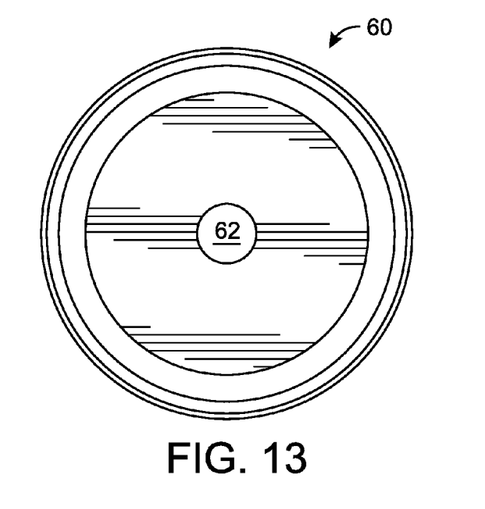
FIG. 13 is a front view of the plunger shown in FIG. 11.

Target holder 20 includes a plunger 60 disposed in retainer 40 as shown in FIGS. 2-5. Referring further to FIGS. 11-13, in one embodiment plunger 60 has a conical or cup shape and defines a central aperture 62 to facilitate operatively coupling plunger 60 to a lever 70, as discussed herein. Plunger 60 is configured to urge terminal end portion 42 of retainer 40 radially outward with respect to central axis 28 to secure retainer 40 in contact and/or engagement with vehicle wheel 24. More specifically, in the embodiment shown in FIGS. 2-5, for example, plunger 60 is configured to move along central axis 28 toward retainer 40 to urge members 46 at terminal end portion 42 to expand radially outward from central axis 28. Plunger 60 is also configured, in certain embodiments, to move along central axis 28 away from retainer 40 to release from retainer 40 and allow retainer 40 to move toward a biased closed configuration.

Figure 3:
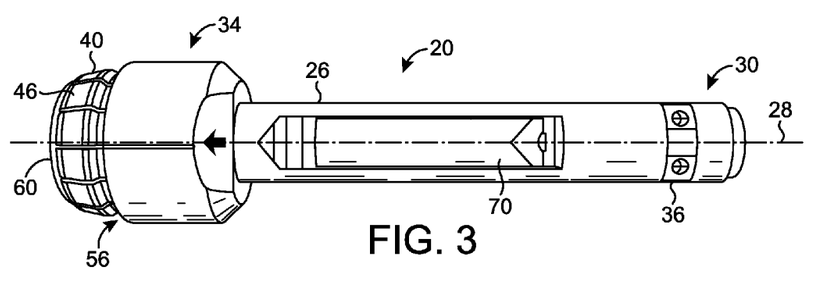
FIG. 3 is a top view of the target holder shown in FIG. 2.
Figure 4:
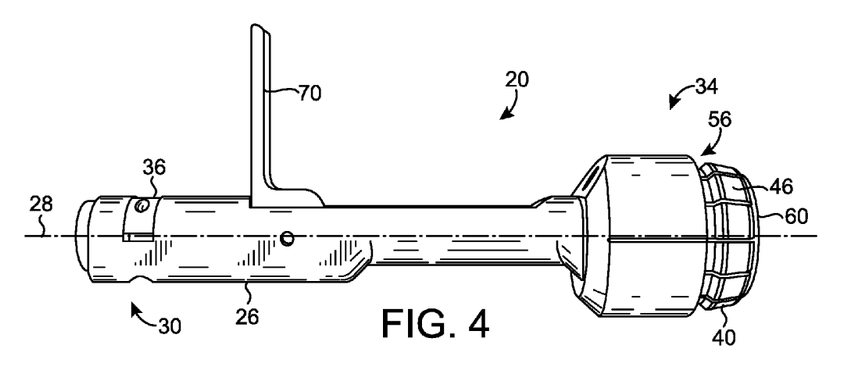
FIG. 4 is a side view of the target holder shown in FIG. 2.
Figure 5:
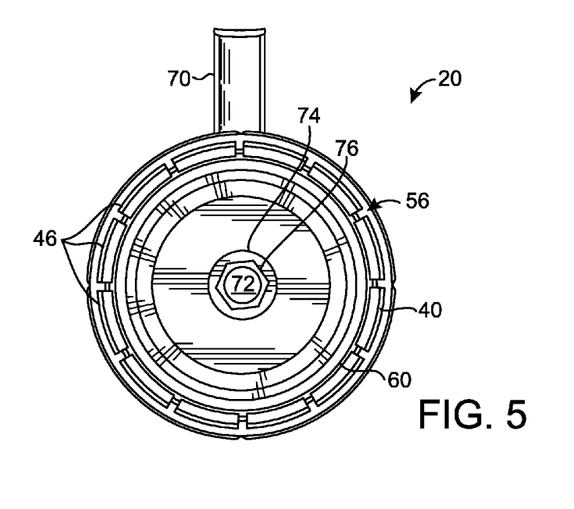
FIG. 5 is a front view of the target holder shown in FIG. 2.
Figure 6:
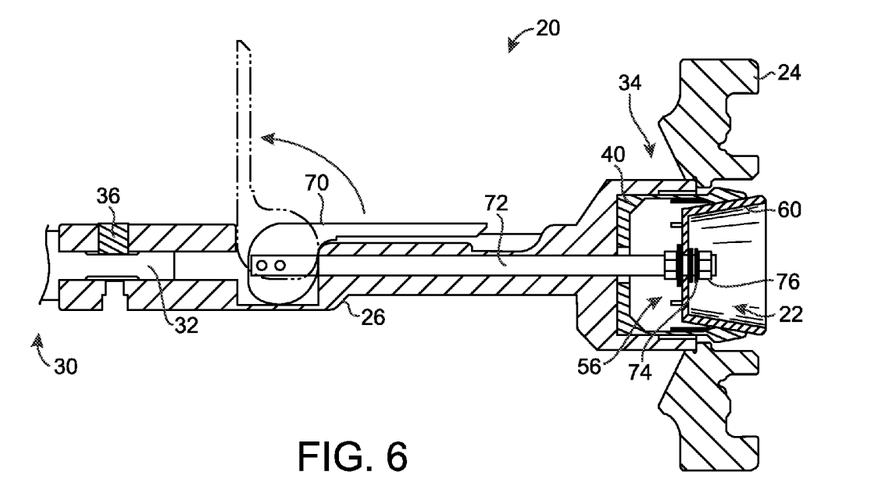
FIG. 6 is a partial sectional view of the target holder shown in FIG. 2.
Figure 7:
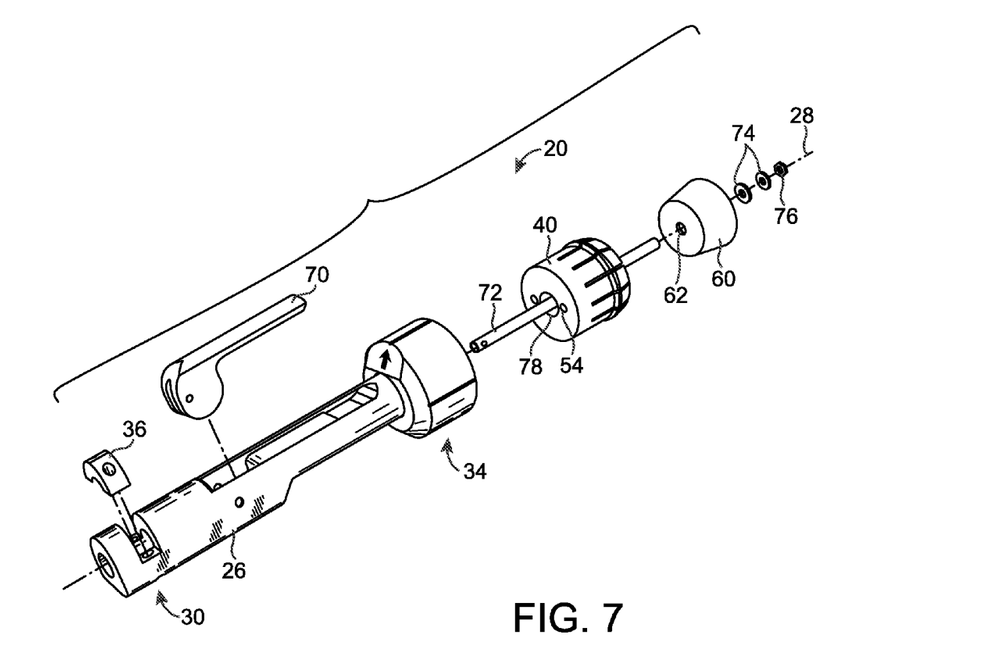
FIG. 7 is an exploded perspective view of the target holder shown in FIG. 2.

As shown, for example, in FIGS. 2-5, lever 70 is pivotably coupled to base 26 and operatively coupled to plunger 60. Lever 70 is configured to pivot with respect to base 26 between a first or open position, as shown in FIG. 4, for example, and a second or closed position, as shown in FIG. 3, for example, with an outer surface of lever 70 substantially flush with an outer surface of base 26. In one embodiment, a linkage rod 72 or other suitable coupling mechanism, such as a bolt, pin or an elongated shaft, is positioned within base 26 to operatively couple lever 70 to plunger 60. In one embodiment, linkage rod 72 is positioned along central axis 28 to move along central axis 28. As shown in FIG. 5, linkage rod 72 is coupled to plunger 60 using one or more suitable washers 74, such as a flat metal or alloy washer and/or a rubber washer, and nut 76, although other suitable coupling mechanisms may be used to couple linkage rod 72 to plunger 60. As shown in FIGS. 8 and 10, retainer 40 defines a central void 78 to allow linkage rod 72 to extend freely though retainer 40 to couple to plunger 60.

Referring to FIG. 4, with lever 70 in the first position, plunger 60 is released from retainer 40 and retainer 40 is in a closed configuration. With retainer 40 inserted into central aperture 22 of vehicle wheel 24, for example, lever 70 is actuateable to move plunger 60 along central axis 28 with respect to retainer 40 to urge terminal end portion 42 of retainer 40 to expand radially outward with respect to central axis 28 to contact and/or engage the inner wall of vehicle wheel 24 defining central aperture 22. As lever 70 is moved from the first position to the second position, as shown in FIG. 3, linkage rod 72 moves along central axis 28 to urge plunger 60 against retainer 40 to move retainer 40 to the expanded configuration with lever 70 in the second position. More specifically, in one embodiment, as lever 70 moves linkage rod 72 to move plunger 60 toward retainer 40, plunger 60 contacts retainer 40 and applies a force to retainer 40 at terminal end portion 42 to urge members 46 to expand radially outward from central axis 28 to contact the inner wall of vehicle wheel 24 defining central aperture 22. Conversely, as lever 70 is moved from the second position to the first position, linkage rod 72 moves along central axis 28 of target holder 20 to urge plunger 60 away from retainer 40 to release plunger 60 from retainer 40 and allow retainer 40 to move to the closed configuration.

Figure 14:
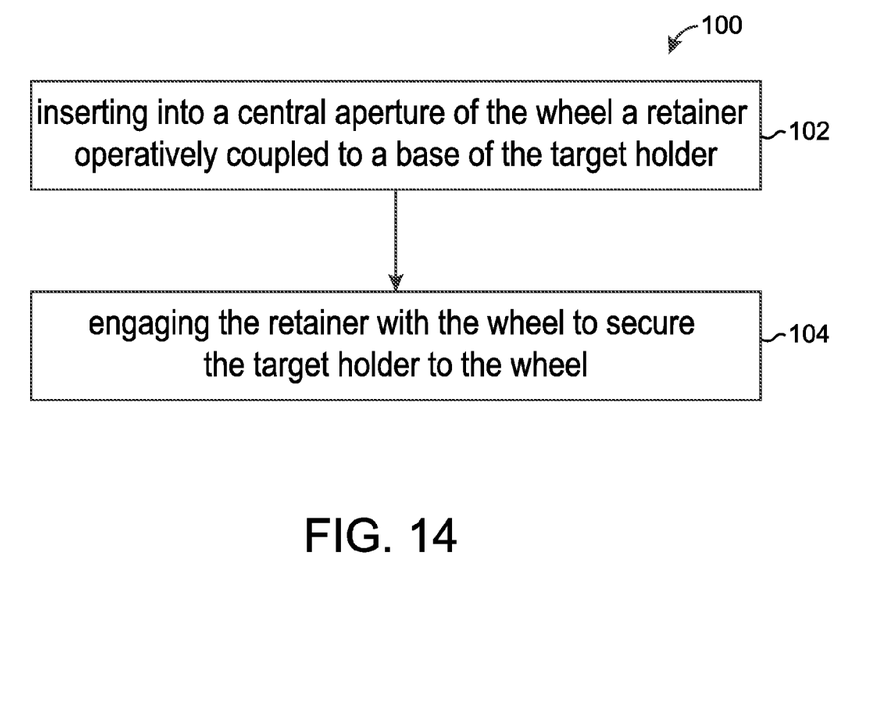
FIG. 14 depicts an exemplary method for coupling a target holder to a vehicle wheel.

In one embodiment, an exemplary method 100 for coupling a target holder 20 to a wheel of a vehicle, as depicted in FIG. 14, includes inserting 102 into central aperture 22 of vehicle wheel 24, retainer 40 operatively coupled to base 26 of target holder 20 and engaging 104 retainer 40 with vehicle wheel 24 to secure target holder 20 to vehicle wheel 24. In a particular embodiment, with retainer 40 inserted into central aperture 22 of vehicle wheel 24, plunger 60 disposed in retainer 40 is moved toward retainer 40 to urge terminal end portion 42 of retainer 40 to expand radially outward with respect to central axis 28 of target holder 20 to contact and/or engage the inner wall of vehicle wheel 24 defining central aperture 22. In this embodiment, lever 70 pivotably coupled to base 26 and operatively coupled to plunger 60 is actuated from a first position to a second position to move plunger 60 to urge terminal end portion 42 of retainer 40 to expand radially outward from central axis 28. As lever 70 is actuated from the first position to the second position, linkage rod 72 moves along central axis 28 of target holder 20 to urge plunger 60 against retainer 40 to move retainer 40 to an expanded configuration with lever 70 in the second position. With retainer 40 in the expanded configuration, each member 46 disposed around a perimeter of retainer 40 at terminal end portion 42 extends radially outward from central axis 28 to contact and/or engage the inner wall of vehicle wheel 24 defining central aperture 22. In certain embodiments, a suitable target 22 is coupled to base 26.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments. As used herein, the word "exemplary" means serving as an example, instance, or illustration. Any aspect or embodiment described herein as "exemplary" is not necessarily to be construed as preferred or advantageous over other aspects or embodiments.

What is claimed is:

1. A target holder that can be secured within a central aperture of a vehicle wheel, the target holder comprising:
   a base defining a central axis of the target holder, the base having a first end configured to receive a target and an opposing second end;
   a retainer coupled to the second end of the base, the retainer insertable into the central aperture and engageable with the vehicle wheel to secure the target holder to the vehicle wheel;
   a plunger disposed in the retainer; and
   a lever pivotably coupled to the base and operatively coupled to the plunger, with the retainer inserted into the central aperture, the lever is actuateable to move the plunger with respect to the retainer to urge a terminal end portion of the retainer to expand radially outward with respect to the central axis to engage an inner wall of the vehicle wheel defining the central aperture.

2. The target holder of claim 1, further comprising a bolt positioned within the base and operatively coupling the lever to the plunger.

3. The target holder of claim 2, wherein, with the lever in a first position, the plunger is released from the retainer and the retainer is in a closed configuration.

4. The target holder of claim 3, wherein, as the lever is moved from the first position to a second position, the bolt moves along the central axis to urge the plunger against the retainer to move the retainer to an expanded configuration with the lever in the second position.

5. The target holder of claim 4, wherein the retainer comprises a plurality of members disposed around a perimeter of the retainer at the terminal end portion and, with the retainer in the expanded configuration, each member of the plurality of members expands radially outward from the central axis to engage the inner wall of the vehicle wheel.

6. The target holder of claim 1, wherein the terminal end portion of the retainer defines a plurality of members disposed around a perimeter of the retainer, adjacent members of the plurality of members separated by a slot to enable the terminal end portion of the retainer to radially expand and contract.

7. The target holder of claim 6, wherein each member of the plurality of members has an outer surface configured to contact the inner wall of the vehicle wheel.

8. The target holder of claim 7, wherein the plunger is configured to urge the terminal end portion of the retainer radially outward with respect to the central axis to secure the outer surface in engagement with the vehicle wheel.

9. The target holder of claim 1, wherein the retainer is received in the second end of the base.

10. The target holder of claim 1, further comprising a clamp coupling the target to the base.

11. A target holder to facilitate alignment of wheels on a vehicle, the target holder comprising:
    a base defining a central axis of the target holder, the base having a first end configured to receive a target and an opposing second end defining a cylindrical recess;
    a retainer positioned within the cylindrical recess and fixedly coupled to the second end of the base, a terminal end portion of the retainer movable between a closed configuration and an expanded configuration to engage an inner wall of a wheel defining a central aperture of the wheel;
    a plunger disposed in the retainer;
    a lever pivotably coupled to the base and movable between a first position and a second position; and
    a bolt positioned within the base along the central axis, the bolt operatively coupling the lever to the plunger, wherein, as the lever is moved from the first position to the second position, the bolt moves along the central axis of the target holder to urge the plunger against the retainer to move the terminal end portion of the retainer to the expanded configuration with the lever in the second position.

12. The target holder of claim 11, wherein, as the lever is moved from the second position to the first position, the bolt moves along the central axis of the target holder to urge the plunger away from the retainer to release the plunger from the retainer and allow the retainer to move to the closed configuration.

13. The target holder of claim 11, wherein the terminal end portion of the retainer defines a plurality of members disposed around a perimeter of the retainer, adjacent members of the plurality of members separated by a slot to enable the terminal end portion of the retainer to radially expand and contract with respect to the central axis.

14. The target holder of claim 13, wherein each member of the plurality of members includes a protrusion on an outer surface of the member to engage the wheel.

15. A method for coupling a target holder to a wheel of a vehicle, said method comprising:
    inserting into a central aperture of the wheel a retainer operatively coupled to a base of the target holder; and
    engaging the retainer with the wheel to secure the target holder to the wheel.

16. The method of claim 15, further comprising, with the retainer inserted into the central aperture of the wheel, moving a plunger disposed in the retainer toward the retainer to urge a terminal end portion of the retainer to expand radially outward with respect to a central axis of the target holder to engage an inner wall of the wheel defining the central aperture.

17. The method of claim 16, wherein moving a plunger comprises actuating a lever, pivotably coupled to the base and operatively coupled to the plunger, from a first position to a second position to move the plunger toward the retainer to urge the terminal end portion of the retainer to expand radially outward with respect to the central axis.

18. The method of claim 17, wherein, as the lever is actuated from the first position to the second position, a bolt moves along the central axis of the target holder to urge the plunger against the retainer to move the retainer to an expanded configuration with the lever in the second position.

19. The method of claim 18, wherein the terminal end portion of the retainer comprises a plurality of members disposed around a perimeter of the retainer and, with the retainer in the expanded configuration, each member of the plurality of members extends radially outward from the central axis to engage the inner wall of the wheel.

20. The method of claim 15, further comprising coupling a target to the base.

* * * * *